(12) United States Patent
McAlpine et al.

(10) Patent No.: US 7,397,932 B2
(45) Date of Patent: *Jul. 8, 2008

(54) FACIAL FEATURE-LOCALIZED AND GLOBAL REAL-TIME VIDEO MORPHING

(75) Inventors: Paul McAlpine, Fremont, CA (US); Todd Hernandez, San Jose, CA (US); John Bateman, San Francisco, CA (US); Remy Zimmermann, Belmont, CA (US); Philippe Depallens, Mountain View, CA (US)

(73) Assignee: Logitech Europe S.A., Romanel-sur-Morges (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/717,303

(22) Filed: Mar. 12, 2007

(65) Prior Publication Data
US 2007/0174775 A1 Jul. 26, 2007

Related U.S. Application Data

(63) Continuation of application No. 11/183,179, filed on Jul. 14, 2005, now Pat. No. 7,209,577.

(51) Int. Cl.
*G06K 9/00* (2006.01)
(52) U.S. Cl. .................. 382/118; 382/118; 382/190; 345/646

(58) Field of Classification Search ................ 382/100, 382/118, 115, 155, 173, 190; 345/473, 619, 345/646; 715/500.1; 348/14.16, 14.01, 586; 446/392; 725/105
See application file for complete search history.

(56) References Cited

U.S. PATENT DOCUMENTS

| 2,297,844 A | 10/1942 | Shoemaker |
| 3,941,925 A | 3/1976 | Busch et al. |
| 4,005,261 A | 1/1977 | Sato et al. |
| 4,021,847 A | 5/1977 | Van Atta |
| 4,023,064 A | 5/1977 | Schagen et al. |

(Continued)

FOREIGN PATENT DOCUMENTS

JP    09/160575 A    6/1997

(Continued)

OTHER PUBLICATIONS

Lee, Sonou et al.; "CFBOX™: Superimposing 3D Human Face on Motion Picture"; 2001, *Proceedings of the Seventh International Conference on Virtual Systems and Multimedia*, 8 pages.

(Continued)

*Primary Examiner*—Sheela Chawan
(74) *Attorney, Agent, or Firm*—Townsend and Townsend and Crew, LLP

(57) ABSTRACT

A method and apparatus for modifying, or morphing, a video image. A video feed is received which include an image of a person's face. A number of facial features are detected from the video feed. One or more of those facial features are selected and modified, with the modification being applied to the video feed to produce a morphed image. For example, the morphing can produce fun effects such as oversized or too small eyes, lips, etc.

10 Claims, 6 Drawing Sheets

U.S. PATENT DOCUMENTS

| | | |
|---|---|---|
| 4,032,785 A | 6/1977 | Green et al. |
| 4,093,959 A | 6/1978 | Hedlund |
| 4,107,741 A | 8/1978 | Lemelson |
| 4,160,263 A | 7/1979 | Christy et al. |
| 4,206,965 A | 6/1980 | McGrew |
| 4,234,894 A | 11/1980 | Tokumaru et al. |
| 4,255,764 A | 3/1981 | Howe |
| 4,267,561 A | 5/1981 | Karpinsky et al. |
| 4,306,252 A | 12/1981 | Fernside |
| 4,315,282 A | 2/1982 | Schumacher |
| 4,337,482 A | 6/1982 | Coutta |
| 4,340,905 A | 7/1982 | Balding |
| 4,371,893 A | 2/1983 | Rabeisen |
| 4,383,279 A | 5/1983 | Kenney, II |
| 4,398,211 A | 8/1983 | Young |
| 4,411,489 A | 10/1983 | McGrew |
| 4,445,140 A | 4/1984 | Netzer |
| 4,470,816 A | 9/1984 | Marshall et al. |
| 4,491,868 A | 1/1985 | Berridge, Jr. et al. |
| 4,558,329 A | 12/1985 | Honda |
| 4,567,515 A | 1/1986 | Schumacher |
| 4,602,280 A | 7/1986 | Maloomian |
| 4,606,068 A | 8/1986 | Habitzreiter et al. |
| 4,629,298 A | 12/1986 | Trumbull et al. |
| 4,658,297 A | 4/1987 | Nomura et al. |
| 4,660,101 A | 4/1987 | Martin |
| 4,668,095 A | 5/1987 | Maeda |
| 4,682,220 A | 7/1987 | Beurskens |
| 4,717,951 A | 1/1988 | Fling |
| 4,727,416 A | 2/1988 | Cooper et al. |
| 4,731,666 A | 3/1988 | Csesznegi |
| 4,731,743 A | 3/1988 | Blancato |
| 4,750,041 A | 6/1988 | Vogel et al. |
| 4,757,387 A | 7/1988 | Saito |
| 4,763,146 A | 8/1988 | Niikura |
| 4,776,796 A | 10/1988 | Nossal |
| 4,777,527 A | 10/1988 | Camps et al. |
| 4,795,253 A | 1/1989 | Sandridge et al. |
| 4,795,261 A | 1/1989 | Nakata et al. |
| 4,804,983 A | 2/1989 | Thayer, Jr. |
| 4,809,247 A | 2/1989 | Elliott |
| 4,815,845 A | 3/1989 | Colbaugh et al. |
| 4,823,285 A | 4/1989 | Blancato |
| 4,827,532 A | 5/1989 | Bloomstein |
| 4,844,475 A | 7/1989 | Saffer et al. |
| 4,845,641 A | 7/1989 | Ninomiya et al. |
| 4,855,813 A | 8/1989 | Russell et al. |
| 4,864,410 A | 9/1989 | Andrews et al. |
| 4,868,661 A | 9/1989 | Takahashi |
| 4,872,056 A | 10/1989 | Hicks et al. |
| 4,888,668 A | 12/1989 | Roll |
| 4,890,159 A | 12/1989 | Ogin |
| 4,896,175 A | 1/1990 | Thayer, Jr. |
| 4,897,827 A | 1/1990 | Raetzer et al. |
| 4,899,921 A | 2/1990 | Bendat et al. |
| 4,903,068 A | 2/1990 | Shiota |
| 4,908,700 A | 3/1990 | Ishii et al. |
| RE33,224 E | 5/1990 | Speigelstein |
| 4,933,773 A | 6/1990 | Shiota et al. |
| 4,934,773 A | 6/1990 | Becker |
| 4,937,665 A | 6/1990 | Schiffman |
| 4,943,867 A | 7/1990 | Suetaka et al. |
| 4,945,379 A | 7/1990 | Date et al. |
| 4,959,670 A | 9/1990 | Thayer, Jr. |
| 4,965,819 A | 10/1990 | Kannes |
| 4,969,040 A | 11/1990 | Gharaui |
| 4,971,312 A | 11/1990 | Weinreich |
| 4,973,890 A | 11/1990 | Desjardins |
| 4,979,815 A | 12/1990 | Tsikos |
| 4,985,762 A | 1/1991 | Smith |
| 4,987,432 A | 1/1991 | Landwehr |
| 4,991,005 A | 2/1991 | Smith |
| 4,991,014 A | 2/1991 | Takahashi et al. |
| 4,995,068 A | 2/1991 | Chou et al. |
| 4,999,586 A | 3/1991 | Meyer et al. |
| 5,027,223 A | 6/1991 | Suetaka et al. |
| 5,032,930 A | 7/1991 | Suetaka et al. |
| 5,034,817 A | 7/1991 | Everett, Jr. |
| 5,111,300 A | 5/1992 | Nam |
| 5,155,600 A | 10/1992 | Maeda |
| 5,164,834 A | 11/1992 | Fukuda et al. |
| 5,168,354 A | 12/1992 | Martinez et al. |
| 5,179,421 A | 1/1993 | Parker et al. |
| 5,184,228 A | 2/1993 | Kobayashi et al. |
| 5,189,490 A | 2/1993 | Shetty et al. |
| 5,190,286 A | 3/1993 | Watanebe et al. |
| 5,196,949 A | 3/1993 | Swanberg |
| 5,198,305 A | 3/1993 | Wada et al. |
| 5,206,629 A | 4/1993 | Demond et al. |
| 5,218,441 A | 6/1993 | Karcher |
| 5,218,626 A | 6/1993 | Mckee |
| 5,223,927 A | 6/1993 | Kageyama et al. |
| 5,231,432 A | 7/1993 | Glenn |
| 5,235,420 A | 8/1993 | Gharaui |
| 5,249,967 A | 10/1993 | O'Leary et al. |
| 5,257,091 A | 10/1993 | Caicedo, Jr. et al. |
| 5,268,734 A | 12/1993 | Parker et al. |
| 5,274,464 A | 12/1993 | Strolle et al. |
| 5,274,498 A | 12/1993 | Rios-Rivera et al. |
| 5,277,499 A | 1/1994 | Kameyama |
| 5,278,662 A | 1/1994 | Womach et al. |
| 5,283,433 A | 2/1994 | Tsien |
| 5,296,924 A | 3/1994 | de Saint Blancard et al. |
| 5,299,274 A | 3/1994 | Wysocki et al. |
| 5,300,942 A | 4/1994 | Dolgoff |
| 5,301,030 A | 4/1994 | Ko |
| 5,303,043 A | 4/1994 | Glenn |
| 5,309,496 A | 5/1994 | Winsor |
| 5,311,568 A | 5/1994 | McKee, Jr. et al. |
| 5,317,405 A | 5/1994 | Kuriki et al. |
| 5,321,499 A | 6/1994 | Yu et al. |
| 5,330,184 A | 7/1994 | Douglas |
| 5,358,407 A | 10/1994 | Lainer |
| 5,369,433 A | 11/1994 | Baldwin et al. |
| 5,376,978 A | 12/1994 | Bae |
| 5,380,206 A | 1/1995 | Asprey |
| 5,392,080 A | 2/1995 | Galt et al. |
| 5,394,198 A | 2/1995 | Janow |
| 5,396,301 A | 3/1995 | Sasaki et al. |
| 5,398,082 A | 3/1995 | Henderson et al. |
| 5,414,521 A | 5/1995 | Ansley |
| 5,424,838 A | 6/1995 | Siu |
| 5,426,460 A | 6/1995 | Erving et al. |
| 5,439,408 A | 8/1995 | Wilkinson |
| 5,448,315 A | 9/1995 | Soohoo |
| 5,451,163 A | 9/1995 | Black |
| 5,455,694 A | 10/1995 | Ariki et al. |
| 5,465,132 A | 11/1995 | Mangelsdorf |
| 5,465,144 A | 11/1995 | Parket et al. |
| 5,467,104 A | 11/1995 | Furness, III et al. |
| 5,497,237 A | 3/1996 | Hosohkawa et al. |
| 5,502,505 A | 3/1996 | Nakata et al. |
| 5,513,116 A | 4/1996 | Buckley et al. |
| 5,533,921 A | 7/1996 | Wilkinson |
| 5,534,917 A | 7/1996 | MacDougall |
| 5,546,316 A | 8/1996 | Buckley et al. |
| 5,554,033 A | 9/1996 | Bizzi et al. |
| 5,559,714 A | 9/1996 | Banks et al. |
| 5,563,988 A | 10/1996 | Maes et al. |
| 5,564,698 A | 10/1996 | Honey et al. |
| 5,579,054 A | 11/1996 | Sezan et al. |
| 5,603,617 A | 2/1997 | Light |
| 5,612,716 A | 3/1997 | Chida et al. |
| 5,617,386 A | 4/1997 | Choi |

| | | |
|---|---|---|
| 5,656,907 A | 8/1997 | Chainani et al. |
| 5,657,073 A | 8/1997 | Henley |
| 5,659,692 A | 8/1997 | Poggio et al. |
| 5,668,629 A | 9/1997 | Parker et al. |
| 5,681,223 A | 10/1997 | Weinreich |
| 5,689,575 A | 11/1997 | Sako et al. |
| 5,689,799 A | 11/1997 | Dougherty et al. |
| 5,697,829 A | 12/1997 | Chainani et al. |
| 5,697,844 A | 12/1997 | Von Kohorn |
| 5,717,454 A | 2/1998 | Adolphi et al. |
| 5,724,074 A | 3/1998 | Chainani et al. |
| 5,724,519 A | 3/1998 | Kato et al. |
| 5,740,303 A | 4/1998 | Ban |
| 5,790,124 A | 8/1998 | Fischer et al. |
| 5,825,941 A | 10/1998 | Linford et al. |
| 5,846,086 A | 12/1998 | Bizzi et al. |
| 5,850,463 A | 12/1998 | Horii |
| 5,862,517 A | 1/1999 | Honey et al. |
| 5,892,554 A | 4/1999 | DiCicco et al. |
| 5,897,413 A | 4/1999 | Erland |
| 5,903,317 A | 5/1999 | Sharir et al. |
| 5,912,700 A | 6/1999 | Honey et al. |
| 5,916,024 A | 6/1999 | Von Kohorn |
| 5,923,791 A | 7/1999 | Hanna et al. |
| 5,954,077 A | 9/1999 | Wain et al. |
| 5,963,257 A | 10/1999 | Katata et al. |
| 5,969,715 A | 10/1999 | Dougherty et al. |
| 5,982,352 A | 11/1999 | Pryor |
| 5,986,670 A | 11/1999 | Dries et al. |
| 5,986,708 A | 11/1999 | Katata et al. |
| 5,993,048 A | 11/1999 | Banks et al. |
| 5,999,173 A | 12/1999 | Ubillos |
| 6,016,148 A | 1/2000 | Kang et al. |
| 6,023,299 A | 2/2000 | Katata et al. |
| 6,023,301 A | 2/2000 | Katata et al. |
| 6,028,593 A | 2/2000 | Rosenberg et al. |
| 6,037,989 A | 3/2000 | Kim |
| 6,075,568 A | 6/2000 | Matsuura |
| 6,084,914 A | 7/2000 | Katata et al. |
| 6,121,953 A | 9/2000 | Walker |
| 6,122,017 A | 9/2000 | Taubman |
| 6,126,551 A | 10/2000 | Martin |
| 6,130,677 A | 10/2000 | Kunz |
| 6,140,932 A | 10/2000 | Frank et al. |
| 6,141,060 A | 10/2000 | Honey et al. |
| 6,147,709 A | 11/2000 | Martin et al. |
| 6,148,148 A | 11/2000 | Wain et al. |
| 6,154,250 A | 11/2000 | Honey et al. |
| 6,157,396 A | 12/2000 | Margulis et al. |
| 6,163,322 A | 12/2000 | LaChapelle |
| 6,167,356 A | 12/2000 | Squadron et al. |
| 6,198,509 B1 | 3/2001 | Dougherty et al. |
| 6,206,750 B1 | 3/2001 | Barad et al. |
| 6,208,386 B1 | 3/2001 | Wilf et al. |
| 6,211,941 B1 | 4/2001 | Erland |
| 6,222,550 B1 | 4/2001 | Rosman et al. |
| 6,229,550 B1 | 5/2001 | Gloudemans et al. |
| 6,229,904 B1 | 5/2001 | Huang et al. |
| 6,233,736 B1 | 5/2001 | Wolzien |
| 6,243,491 B1 | 6/2001 | Andersson |
| 6,252,632 B1 | 6/2001 | Cavallero |
| 6,266,100 B1 | 7/2001 | Gloudemans et al. |
| 6,272,231 B1 | 8/2001 | Maurer et al. |
| 6,287,299 B1 | 9/2001 | Sasnett et al. |
| 6,292,130 B1 | 9/2001 | Cavallaro et al. |
| 6,297,853 B1 | 10/2001 | Sharir et al. |
| 6,298,197 B1 | 10/2001 | Wain et al. |
| 6,301,370 B1 | 10/2001 | Steffens et al. |
| 6,304,665 B1 | 10/2001 | Cavallaro et al. |
| 6,317,127 B1 | 11/2001 | Daily et al. |
| 6,330,595 B1 | 12/2001 | Ullman et al. |
| 6,333,985 B1 | 12/2001 | Ueda et al. |
| 6,356,659 B1 | 3/2002 | Wiskott et al. |
| 6,361,173 B1 | 3/2002 | Ulahos et al. |
| 6,363,525 B1 | 3/2002 | Daugherty et al. |
| 6,366,272 B1 | 4/2002 | Rosenberg et al. |
| 6,371,862 B1 | 4/2002 | Reda |
| 6,373,508 B1 | 4/2002 | Moengen |
| 6,384,871 B1 | 5/2002 | Wilf et al. |
| 6,400,374 B2 | 6/2002 | Lanier |
| 6,425,825 B1 | 7/2002 | Sitrick |
| 6,430,743 B1 | 8/2002 | Matsuura |
| 6,437,820 B1 | 8/2002 | Josefsson |
| 6,438,508 B2 | 8/2002 | Tamir et al. |
| 6,438,753 B1 | 8/2002 | Fegesch et al. |
| 6,441,825 B1 | 8/2002 | Peters |
| 6,441,846 B1 | 8/2002 | Carlbom et al. |
| 6,449,010 B1 | 9/2002 | Tucker |
| 6,449,019 B1 | 9/2002 | Fincher et al. |
| 6,454,415 B1 | 9/2002 | Ulahos |
| 6,456,232 B1 | 9/2002 | Milnes et al. |
| 6,456,340 B1 | 9/2002 | Margulis |
| 6,462,662 B1 | 10/2002 | Rundow et al. |
| 6,463,121 B1 | 10/2002 | Milnes |
| 6,466,695 B1 | 10/2002 | Potzsch et al. |
| 6,498,619 B1 | 12/2002 | Yanagi |
| 6,513,069 B1 | 1/2003 | Abato et al. |
| 6,538,676 B1 | 3/2003 | Peters |
| 6,545,682 B1 | 4/2003 | Ventrella et al. |
| 6,563,950 B1 | 5/2003 | Wiskott et al. |
| 6,567,116 B1 | 5/2003 | Aman et al. |
| 6,570,585 B1 | 5/2003 | Hines et al. |
| 6,574,604 B1 | 6/2003 | van Rijn |
| 6,580,811 B2 | 6/2003 | Maurer et al. |
| 6,597,406 B2 | 7/2003 | Gloudemans et al. |
| 6,606,096 B2 | 8/2003 | Wang |
| 6,614,466 B2 | 9/2003 | Thomas |
| 6,624,843 B2 | 9/2003 | Lennon |
| 6,631,987 B2 | 10/2003 | Reichow et al. |
| 6,634,959 B2 | 10/2003 | Kuesters |
| 6,656,064 B2 | 12/2003 | Zielinski |
| 6,678,641 B2 | 1/2004 | Gibbs et al. |
| 6,707,487 B1 | 3/2004 | Aman et al. |
| 6,714,660 B1 | 3/2004 | Ohba |
| 6,718,104 B2 | 4/2004 | Lowry |
| 6,724,442 B1 | 4/2004 | Zyskowski et al. |
| 6,744,403 B2 | 6/2004 | Milnes et al. |
| 6,750,919 B1 | 6/2004 | Rosser |
| 6,771,319 B2 | 8/2004 | Konuma |
| 6,824,387 B2 | 11/2004 | Sakai et al. |
| 6,824,480 B2 | 11/2004 | John et al. |
| 6,829,432 B2 | 12/2004 | Misumi et al. |
| 6,850,250 B2 | 2/2005 | Hoch |
| 6,879,712 B2 | 4/2005 | Tuncay et al. |
| 6,893,127 B2 | 5/2005 | Reichow et al. |
| 6,903,707 B2 | 6/2005 | Hobgood et al. |
| 6,903,756 B1 | 6/2005 | Giannini |
| 6,909,438 B1 | 6/2005 | White et al. |
| 6,937,696 B1 | 8/2005 | Mostafani |
| 6,950,130 B1 | 9/2005 | Qian |
| 7,000,840 B2 | 2/2006 | Reiffel |
| 7,002,551 B2 | 2/2006 | Azuma et al. |
| 7,006,154 B2 | 2/2006 | Dudkowski |
| 7,006,709 B2 | 2/2006 | Kang et al. |
| 7,020,336 B2 | 3/2006 | Cohen-Solal et al. |
| 7,023,913 B1 | 4/2006 | Monroe |
| 7,027,083 B2 | 4/2006 | Kanade et al. |
| 7,034,803 B1 | 4/2006 | Reiffel |
| 7,039,222 B2 | 5/2006 | Simon et al. |
| 7,043,056 B2 | 5/2006 | Edwards et al. |
| 7,053,915 B1 | 5/2006 | Jung et al. |
| 7,062,454 B1 | 6/2006 | Giannini et al. |
| 7,071,898 B2 | 7/2006 | Hobgood et al. |
| 7,075,556 B1 | 7/2006 | Meier et al. |
| 7,079,176 B1 | 7/2006 | Freeman et al. |
| 7,085,409 B2 | 8/2006 | Sawhney et al. |

| | | |
|---|---|---|
| 7,097,532 B1 | 8/2006 | Rolicki et al. |
| 7,098,891 B1 | 8/2006 | Pryor |
| 7,099,070 B2 | 8/2006 | Reiffel |
| 7,102,666 B2 | 9/2006 | Kanade et al. |
| 7,106,361 B2 | 9/2006 | Kanade et al. |
| 7,116,342 B2 | 10/2006 | Dengler et al. |
| 7,120,871 B1 | 10/2006 | Harrington et al. |
| 7,209,577 B2 * | 4/2007 | McAlpine et al. ........... 382/118 |
| 2001/0033675 A1 | 10/2001 | Maurer et al. |
| 2001/0036860 A1 | 11/2001 | Yonezawa |
| 2002/0032906 A1 | 3/2002 | Grossman |
| 2002/0037332 A1 | 3/2002 | Cohen |
| 2002/0186221 A1 | 12/2002 | Bell |
| 2003/0043153 A1 | 3/2003 | Buddemeier et al. |
| 2003/0156134 A1 | 8/2003 | Kim |
| 2003/0198384 A1 | 10/2003 | Vrhel |
| 2003/0202686 A1 | 10/2003 | Rowe |
| 2003/0206171 A1 | 11/2003 | Kim et al. |
| 2003/0235341 A1 | 12/2003 | Gokturk et al. |
| 2004/0012613 A1 | 1/2004 | Rast |
| 2004/0052499 A1 | 3/2004 | Singh |
| 2004/0085324 A1 | 5/2004 | Yao |
| 2004/0085334 A1 | 5/2004 | Reaney |
| 2004/0201666 A1 | 10/2004 | Matsuo et al. |
| 2004/0239689 A1 | 12/2004 | Fertig et al. |
| 2005/0026685 A1 | 2/2005 | Ruark et al. |
| 2005/0041867 A1 | 2/2005 | Loy et al. |
| 2005/0204287 A1 | 9/2005 | Wang |
| 2005/0286799 A1 | 12/2005 | Huang et al. |
| 2006/0075448 A1 | 4/2006 | McAlpine et al. |

FOREIGN PATENT DOCUMENTS

| | | |
|---|---|---|
| JP | 11-175061 A | 2/1999 |
| JP | 2000-209500 A | 7/2000 |
| JP | 2001-307124 A | 11/2001 |
| JP | 2002-042168 A | 8/2002 |
| JP | WO 2004/021695 A1 | 3/2004 |
| TW | 351795 B | 2/1999 |
| TW | 563053 B | 11/2003 |
| TW | 1254569 B | 5/2006 |
| TW | 200617701 A | 6/2006 |
| WO | WO 97/03517 A1 | 1/1997 |
| WO | WO 01/15450 A1 | 3/2001 |
| WO | WO 01/65854 A1 | 9/2001 |
| WO | WO 01/67759 A2 | 9/2001 |
| WO | WO 02/03706 A1 | 1/2002 |

OTHER PUBLICATIONS

Sul, ChangWhan et al.; "Virtual Stage: A Location-Based Karaoke System"; 1998, *IEEE MultiMedia*, pp. 42-52.

* cited by examiner

FACIAL FEATURE-LOCALIZED AND GLOBAL REAL-TIME VIDEO MORPHING

CROSS-REFERENCES TO RELATED APPLICATIONS

This application is a continuation of U.S. application Ser. No. 11/183,179, filed Jul. 14, 2005 now U.S. Pat. No. 7,209,577 entitled "FACIAL FEATURE-LOCALIZED AND GLOBAL REAL-TIME VIDEO MORPHING", which application is incorporated herein by reference.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to modifying video images, in particular varying features of a person on live video.

Software has existed for some time to modify images, such as a person's face. U.S. Pat. No. 5,825,941 is an example of software allowing a patient to see the effects of proposed plastic surgery before it is done. Other software allows users to modify static pictures that can be saved and printed, such as by varying the features of the face or morphing two faces together. U.S. Published Application No. 20050026685 shows a system for morphing video game characters. U.S. Published Application No. 20040201666 shows using user voice or other inputs to modify a virtual character.

A variety of applications are directed to modifying avatars for use with instant messaging. These applications allow a user to personalize the avatar image that is the representation of the user. For example, U.S. Published Application No. 20030043153 shows determining facial expressions from a webcam video feed and mapping those expressions to an avatar. An animation vector is mapped to a target mix vector. Each morph target may represent a facial expression, such as a neutral facial expression, a surprised facial expression, an angry facial expression, and a smiling facial expression.

BRIEF SUMMARY OF THE INVENTION

The present invention provides a method for modifying, or morphing, a video image. A video feed is received which include an image of a person's face. A number of facial features are detected from the video feed. One or more of those facial features are selected and modified, with the modification being applied to the video feed to produce a morphed image. For example, the morphing can produce fun effects such as oversized or too small eyes, lips, etc.

In one embodiment, the user can choose to modify particular features directly. For example, the user can thicken the lips, widen the mouth, etc. The user can then do similar modifications separately to the eyes, nose, ears, etc. Additionally, the user can select to have a hat or other accessories superimposed over the face.

In another embodiment, the user can select from multiple expressions. The selected expression would then automatically change the particular features required to achieve that expression. For example, the expression for a smile can cause the lips and mouth to raise in the smile expression, and additionally can cause smile lines or dimples and a twinkling appearance in the eyes. Alternately another "expression" such as a younger age could cause the smoothing of the skin to eliminate wrinkles, modification of the facial features to produce a more defined chin, eyes, etc.

In one embodiment, a video feed from a web cam, such as a USB video feed is provided through a camera driver to feature recognition software. That software then provides the location of the identified features to a separate morphing software module. The morphing software module then responds to user inputs to select and apply modifications to the various facial features. These modifications are then applied to the video feed, to produce an output video feed which is only slightly delayed in real time.

DETAILED DESCRIPTION OF THE INVENTION

System

Figure 1:
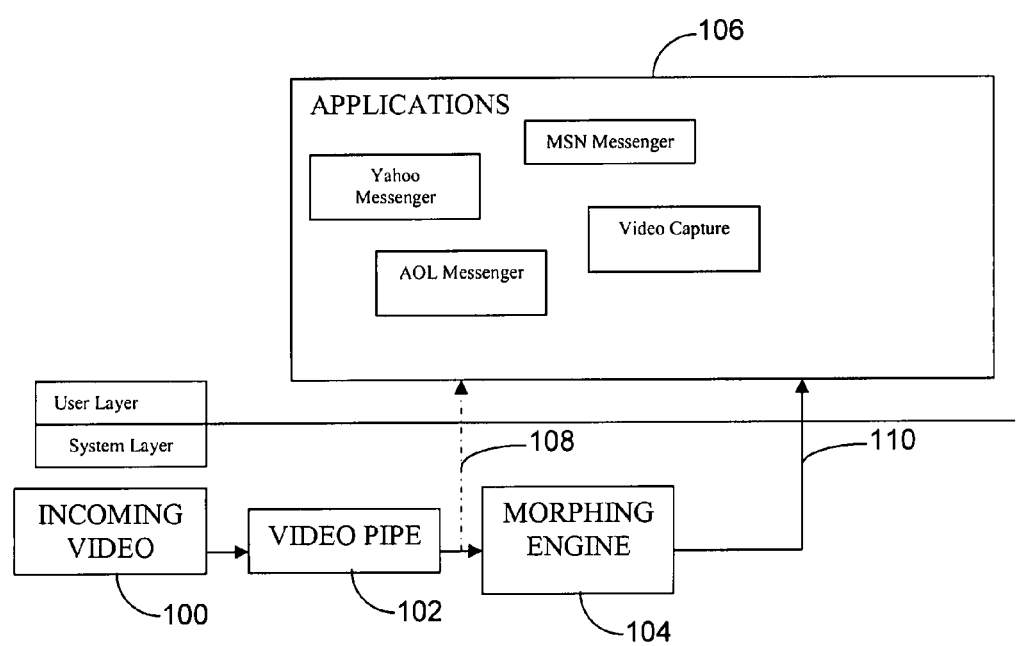
FIG. 1 is a diagram illustrating the system and user layers of software in an embodiment of a system incorporating the morphing features of the present invention.

FIG. 1 illustrates the operation of one embodiment of the invention. Incoming video 100 is provided to a video pipe 102 which is received by the morphing engine 104 of the present invention. The video pipe can be provided directly to applications 106 as indicated by arrow 108, or can be provided to the morphing engine. The morphing engine provides a modified video pipe to the applications as indicated by arrow 110.

The modified video pipe can be used by any application that uses live video input. This includes instant messaging applications (MSN Messenger, Yahoo Messenger, AOL messenger, etc.) as well as video capture applications (when—for example—an artist is capturing the video to the disk). This means that the morphing can be applied before the video is captured to the disk and stored or before it is sent to the interlocutor on the other side of the communication channel. This is because the morphing engine is integrated into the system-level part of the software, which makes it transparent to the applications using the video stream that lay above the system layer at the user layer. In this way the present invention is generic—i.e. it can coexist with any video application and modify its input according to the settings on quick assistant.

Figure 2:
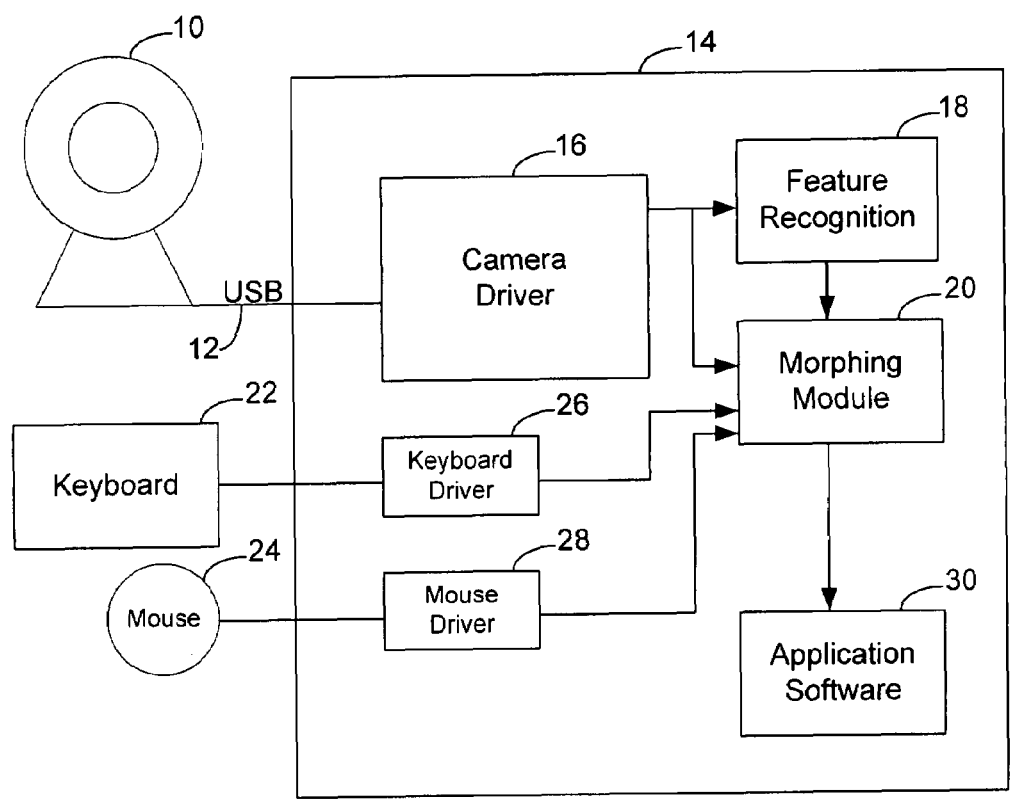
FIG. 2 is a block diagram of an embodiment of a system incorporating the morphing features of the present invention.

FIG. 2 is a block diagram of an embodiment of a system incorporating the morphing of the present invention. A web cam 10 is connected through a USB bus 12 to a computer 14. The USB bus 12 acts as a video feed from the camera to the computer. Alternately, a wireless USB feed could be provided, or any other bus or interface could be used to provide the video. Additionally, a camera, other than the web cam, or any other video source could be used. Additionally, the video source could come from within the computer or through a network to the computer from a remote source.

Computer 14 includes a camera driver 16 which receives the live video and provides it to feature recognition software module 18. Feature recognition module 18 could be any software which extracts information regarding facial features from a video image, such as the software produced by Neven Vision, a machine vision technology company with offices in Santa Monica, Calif.

The detected information regarding facial features is provided to a morphing module 20. The morphing module responds to user inputs to select facial features, determine the type of morphing, and apply the morphing. The user input can be provided through any peripheral, such as keyboard 22 or mouse 24 with associated keyboard driver 26 and mouse driver 28. After the morphing has been applied, the video feed is provided to application software 30. The application software could be an instant messenger application, a video conferencing application, or any other application which uses video. In one embodiment, the delay caused by the use of the feature recognition and morphing software is less than one frame of video.

Morphing Quick Assistant

Figure 3A:
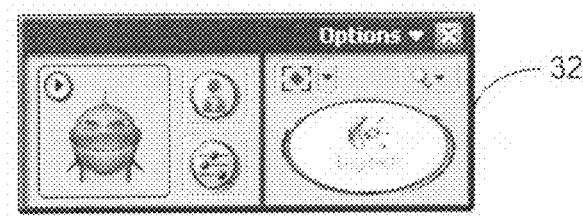
FIGS. 3A and 3B are diagrams of a hovering dialog box and drop down menu in one embodiment of the invention.
Figure 7:
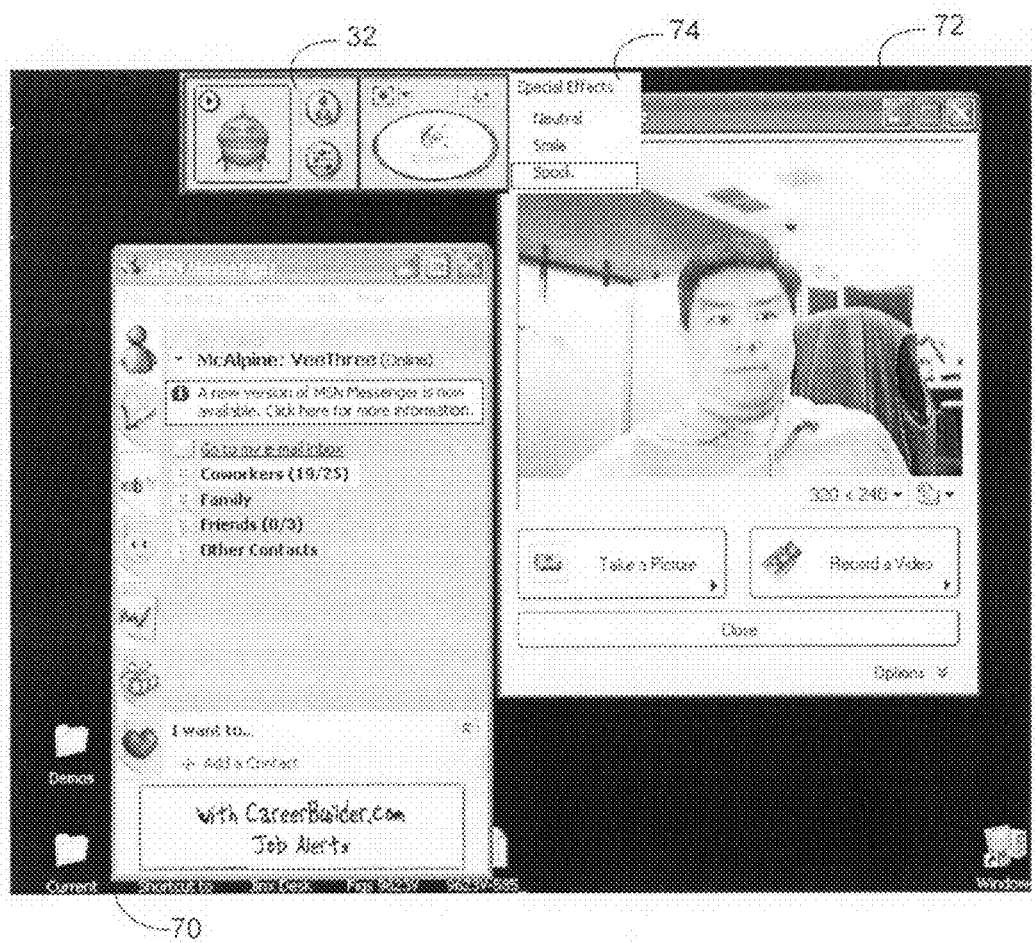
FIG. 7 is a screen shot of an embodiment of an instant messenger application incorporating the morphing feature of the invention.

FIG. 3A shows a hovering dialog box 32, which is a quick assistant that will open and appear on the screen when live video is requested. This automatic activation is accomplished by the camera or video driver software, which detects when a request is made for a video feed from an application, such as an instant messenger application. The quick assistant will appear close to the window of the program that called for the live video, so it will appear as if it were part of that application. An example for instant messaging is shown in FIG. 7. This provides an advantage in allowing the morphing application to work with third-party applications that use a video feed and need not be modified to accommodate the morphing engine. The user will typically assume that the quick assistant is part of that third-party application. This increases the ease of use and acceptation of the new technology.

Figure 3B:
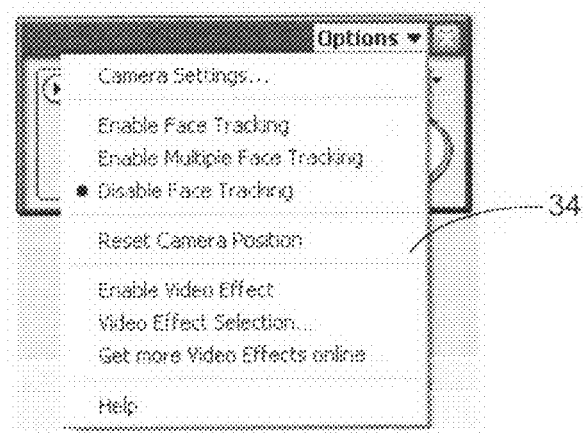

FIG. 3B illustrates a drop down menu 34 of the quick assistant dialog box 32. Examples of options are shown, others may be provided in other embodiments. The user can turn on or off face tracking, and can enable tracking of multiple faces. Face tracking may or may not be required for the feature recognition module. The user can click on the Video Effect Selection and another dialog box would appear, such as the examples set forth in FIG. 4 or 5A. The menu can include options that are not part of the morphing features, but which a user may desire to modify at the same time, such as camera position. The options may allow the user to enable a video morphing effect, select an effect, or go to the Internet to download more effects.

Options

Figure 4:
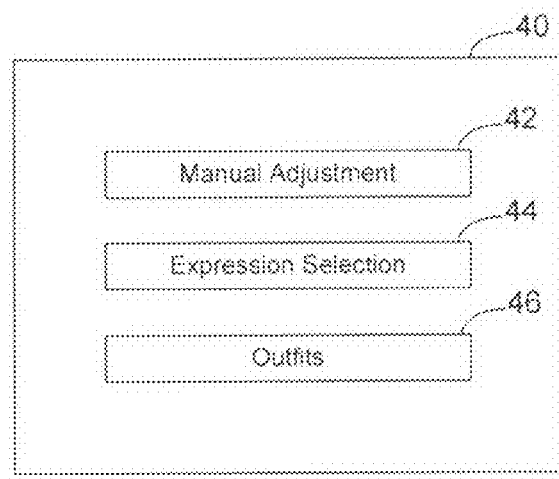
FIG. 4 is a diagram of an embodiment of a user interface screen for selecting the type of morphing.

FIG. 4 is a diagram of one embodiment of an interface screen 40 for the morphing module to allow user selection of different options. This screen in one embodiment is the first screen the user sees when clicking on Video Effect Selection in FIG. 3B. A first button 42 is for selection of manual adjustment. This allows for the user to independently and directly adjust the facial features of the eyes, nose, mouth, etc. Button 44 allows expression selection. This would allow expressions, such as a smile, frown, anger, age, etc. The selection of one of these expressions, such as anger, would cause multiple facial features to be automatically adjusted appropriately without the user needing to adjust each one independently. For example, if anger is chosen, the software could automatically adjust the mouth position, the eyebrows, frown lines in the cheeks, etc. Outfits button 46 allows the user to apply various accessories to the video image. For example, a hat may be placed on the head, a scarf around the neck, earrings or other jewelry, piercings, tattoos, etc.

The morphing module allows a virtual makeover to be applied to a person. The size of the eyes can be changed, and their location can be modified slightly. The iris color can be changed. The lips could be made wider or narrower, or could be accentuated in other ways. A variety of other modifications are available.

Manual Selection

Figure 5A:
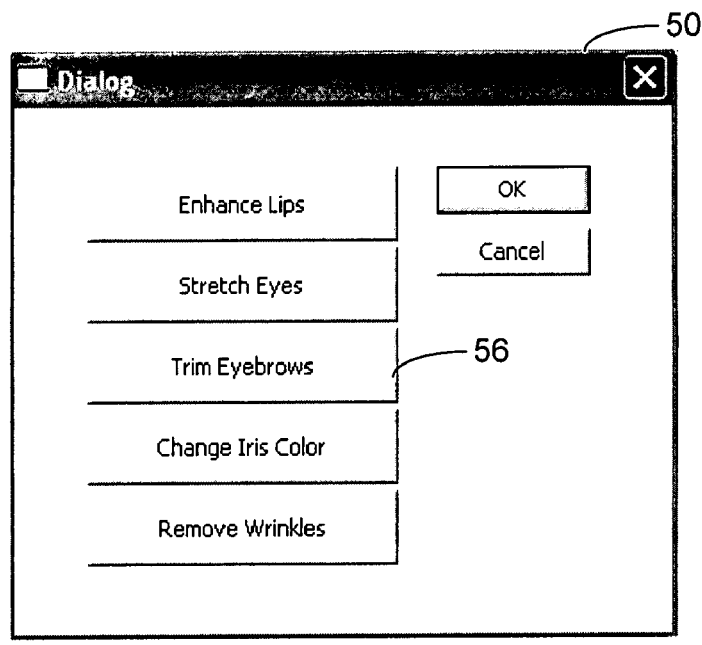
FIGS. 5A and 5B are diagrams of an embodiment of a user interface screen for a manual morphing of features directly.

FIG. 5A is a diagram of an embodiment of a user interface box 50 for manual adjustment of facial features. Box 50 includes a series of buttons or drop down menu 56 which allows selection of particular features, such as enhance lips, stretch eyes, trim eyebrows, change iris color and remove wrinkles, etc. When a particular button is selected, a specialized modification box will appear for the particular facial feature selected.

Figure 5B:
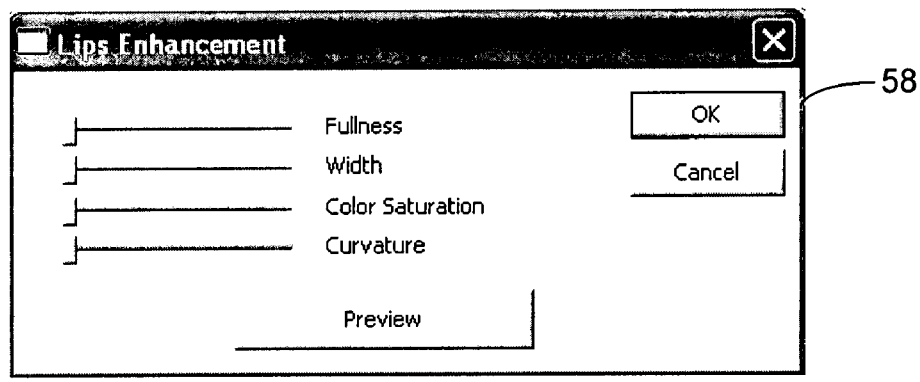

When Lips Enhancement is selected the box 58 of FIG. 5B will appear. In the example shown, separate adjustment sliders are provided for fullness, width, color saturation and curvature. Other facial features will bring up different combinations of adjustment options with different input methods. After setting the desired effects, when the preview button is clicked, a preview window, such as shown in FIG. 7 below, will be provided to allow previewing in real time. In one embodiment, the adjustments of FIG. 5B are displayed at the same time as the preview window, or in the preview window, to allow the user to see the effects of moving the different sliders. It will be appreciated that other inputs than sliders can be used.

Expression Selection

Figure 6:
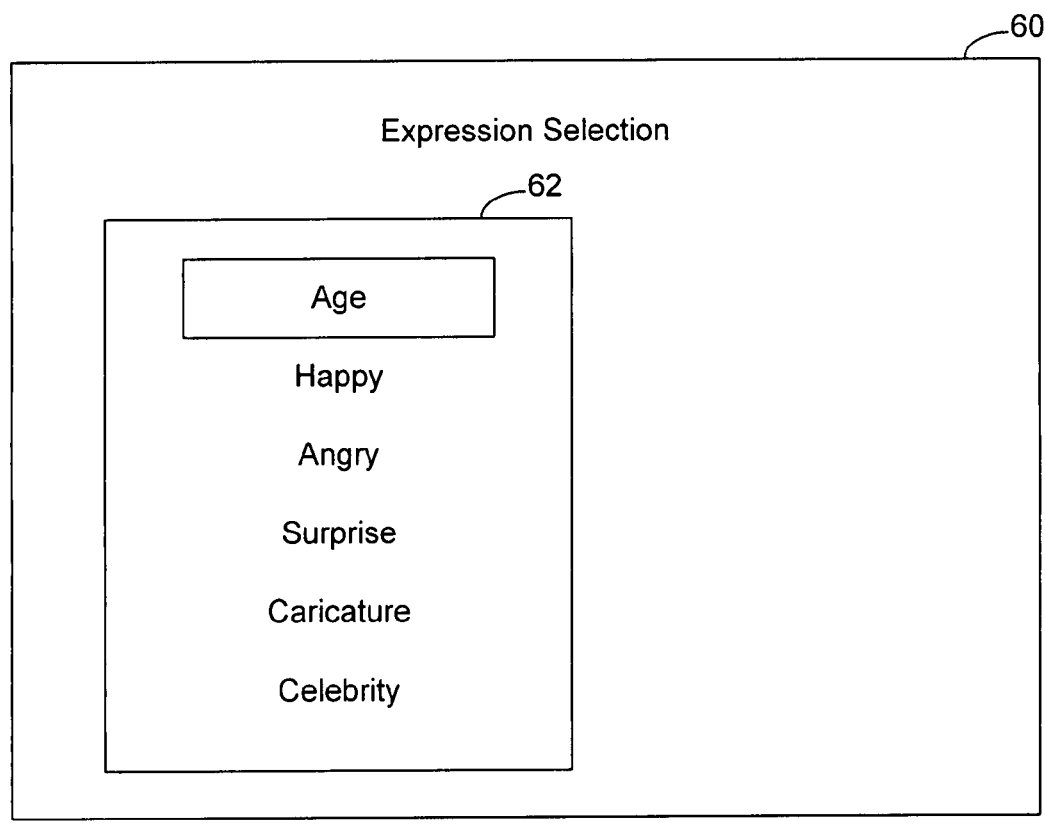
FIG. 6 is a diagram of a user interface screen for expression selection.

FIG. 6 is a diagram of an embodiment of a user interface screen 60 for selecting particular expressions. A drop down menu 62 is provided. The user can select a particular one desired. Upon such a selection, a screen similar to that shown in FIG. 5B would appear with appropriate adjustment buttons. For example, for age, a slider icon may be provided to allow the user to linear move a pointer for a younger or older age. The software then automatically applies the appropriate adjustments to the various features of the face.

Preview Screen

FIG. 7 illustrates one embodiment of a preview screen. An instant messenger window 70 and a video window 72 are shown. Next to them is the hovering dialog box, or quick assistant 32. A drop down menu 74 next to the quick assistant highlights the effect being displayed. In the example shown, a celebrity effect, "Spock," is displayed, with the ears of the user being made pointed and the eyebrows being arched. Becoming more logical is up to the user. Alternate embodiments are possible, such as additional dialog boxes which allow other adjustments or combination of adjustments. For example, the Spock effect could be applied, and the user could also separately enhance the lips or eyes or put on a hat.

Variations

In one embodiment, the deformation applied to a face (e.g., 'fuller lips') would move with the subject. In some prior art applications, the deformation is applied to frontal face. In an embodiment of the present invention, the 3D position of the head and the features is localized and the deformation is adjusted from a frontal position to the actual position of the user. Thus, even if the face is not frontal, the deformation (e.g. full lips) is maintained when the subject rotates his head so the lips or other feature would still look natural, but they would be 'fuller'. This is accomplished with a 3D image being stored and modified for each feature, or with algorithms for adjustment in 3D on the fly being used.

In one embodiment, the present invention is able to apply the modifications to live video on the fly with a delay of less than one frame. This is possible because only certain features of the face are morphed or modified, not the entire face. In one embodiment, less than 20% or less than 10% of the video is modified. This limits the amount of processing necessary and increases the speed at which the morphing can be done.

In another embodiment, the user selects the morphing to be applied before the video is fed to the application software program. In another embodiment, the user can also do the adjustments on the fly, morphing or changing the video image in the middle of an instant messenger conversation, for example.

In one embodiment, the invention is integrated into the video pipe so that it is transparent to any application program. The application program need not be modified to accommodate the present invention, which is applied at the driver level of the video feed.

In another embodiment, popular morphing combinations are stored as a macro or particular expression. These are provided on a website which is accessible by users, and users can create their own and upload them to the website for sharing with other users. Morphing to produce features similar to those of celebrities can be stored as a macro on the web site for downloading.

In one embodiment, such as for a conference call with multiple people present, the morphing can be applied independently to different facial features. Thus, one person could be made to have wider eyes, another can be made smile all the time, another could be made to be anger, and another could be made to look younger.

In addition, an entire image can be morphed with, for example, effects similar to those found in a fun house mirror room. By keeping the effects simple, they can be applied in real time without undue delay. Delay is also cut down by the ability to bypass the facial feature detection software, since this is not needed when the entire image is morphed. In one embodiment, the morphing causes a delay of less than 20 milliseconds.

As will be understood as those of skill in the art, the present invention could be embodied in other specific forms without departing from the essential characteristics of the invention. For example, the morphing could be applied to features of the face of a pet, such as a dog, or any other image. The morphing module could also be made to appear upon initiation of an application program which uses still pictures, such as the sending of snapshots from a cell phone. The morphing engine could be made to appear anytime a video feed is requested by an application program, or only for certain types of application programs. Accordingly, reference should be made to the appended claims which set forth the scope of the claimed invention.

What is claimed is:

1. A method for modifying a video image, comprising:
   receiving a live video feed including an image of a person's face;
   detecting a plurality of facial features from said live video feed;
   selecting at least a first one of said facial features;
   selecting a modification for said first facial feature;
   applying said modification to said live video feed to produce a modified video feed; and
   providing said modified video feed to an application program.

2. The method of claim 1 wherein said selecting at least a first one of said facial features comprises:
   selecting an expression; and
   modifying a plurality of said facial features to achieve said expression.

3. The method of claim 1 wherein said application program is an instant messaging program.

4. The method of claim 1 further comprising:
   displaying a graphical user interface indicating the availability of said selecting steps upon detection of said live video feed.

5. The method of claim 1 further comprising:
   displaying a graphical user interface indicating the availability of said selecting steps upon detection of said application program.

6. An apparatus for modifying a video image, comprising:
   a live video input feed including an image of a person's face;
   a feature detection software module configured to detect a plurality of facial features from said live video feed;
   a morphing software module configured to receive an indication of detected facial features from said feature detection software and enable selection of at least a first one of said facial features, selection of a modification for said first facial feature and application of said modification to said live video feed to produce a modified video feed; and
   a modified video feed output directed to an application program.

7. The apparatus of claim 6 wherein said morphing software module is further configured to allow:
   selecting an expression; and
   modifying a plurality of said facial features to achieve said expression.

8. The apparatus of claim 6 further comprising a quick assistant for accessing said morphing video software.

9. A system for modifying a video image, comprising:
   a live video input feed including an image of a person's face;
   a feature detection software module configured to detect a plurality of facial features from said live video feed;
   a morphing software module configured to receive an indication of detected facial features from said feature detection software and enable selection of at least a first one of said facial features, selection of a modification for said first facial feature and application of said modification to said live video feed to produce a modified video feed; and
   a modified video feed output directed to an application program.

10. The system of claim 9 further comprising:
    a camera generating said live video input feed;
    a computer, communicatively coupled to said camera, containing said morphing software module.

* * * * *